(12) United States Patent
Morris

(10) Patent No.: US 10,749,398 B2
(45) Date of Patent: Aug. 18, 2020

(54) HIGH TORQUE MOTOR FAILSAFE OPERATING SYSTEM

(71) Applicant: Richard Joseph Morris, Discovery Bay, CA (US)

(72) Inventor: Richard Joseph Morris, Discovery Bay, CA (US)

( * ) Notice: Subject to any disclaimer, the term of this patent is extended or adjusted under 35 U.S.C. 154(b) by 0 days.

(21) Appl. No.: 16/267,282

(22) Filed: Feb. 4, 2019

(65) Prior Publication Data

US 2019/0273408 A1    Sep. 5, 2019

Related U.S. Application Data

(63) Continuation-in-part of application No. 14/813,784, filed on Jul. 30, 2015, now Pat. No. 10,199,914.

(60) Provisional application No. 62/030,676, filed on Jul. 30, 2014.

(51) Int. Cl.
| | |
|---|---|
| *H02K 3/28* | (2006.01) |
| *H02K 23/54* | (2006.01) |
| *H02K 3/46* | (2006.01) |
| *H02P 5/74* | (2006.01) |

(52) U.S. Cl.
CPC ............... *H02K 3/28* (2013.01); *H02K 3/46* (2013.01); *H02K 23/54* (2013.01); *H02P 5/74* (2013.01)

(58) Field of Classification Search
CPC ........ H02K 53/00; H02K 11/01; H02K 11/20; H02K 1/16; H02K 1/2793; H02K 1/28; H02K 7/083; H02K 16/04
USPC ............................................................ 310/90
See application file for complete search history.

(56) References Cited

U.S. PATENT DOCUMENTS

| | | | | |
|---|---|---|---|---|
| 6,930,414 B2* | 8/2005 | Qiu | ........................ | H02K 35/06 310/12.25 |
| 7,352,088 B2* | 4/2008 | Qiu | ........................ | H02K 33/16 310/12.21 |
| 2011/0101813 A1* | 5/2011 | Tbatou | ..................... | H02K 5/04 310/156.35 |
| 2013/0173183 A1* | 7/2013 | Castillo | .................. | H02K 11/20 702/58 |
| 2013/0292941 A1* | 11/2013 | Mountain | .............. | H02K 16/04 290/7 |
| 2014/0191624 A1* | 7/2014 | Jahshan | ................. | H02K 35/02 310/68 B |

FOREIGN PATENT DOCUMENTS

GB             2455113 A  *  6/2009   .............. H02K 3/04

* cited by examiner

*Primary Examiner* — Alex W Mok
(74) *Attorney, Agent, or Firm* — West & Associates, A PC; Stuart West; Charlotte Rodeen-Dickert

(57) ABSTRACT

A fail-safe system for powering a multistage hi-torque motor, providing monitoring, redundancy, and alternate modes to improve reliability.

14 Claims, 15 Drawing Sheets

HIGH TORQUE MOTOR FAILSAFE OPERATING SYSTEM

CLAIM OF PRIORITY

This application is a continuation-in-part of U.S. application Ser. No. 14/813,784, filed Jul. 30, 2015, now U.S. Pat No. 10,199,914, which claims priority under 35 U.S.C. § 119(e) to earlier filed U.S. Provisional Application Ser. No. 62/030,676 filed on Jul. 30, 2014, and Appl. Ser. No. 62/166,080 filed on May 25, 2015, by Morris, the entirety of each of which are hereby incorporated herein by reference.

BACKGROUND

Field of Invention

The present invention generally relates to the field of high torque electrical motors. More particularly, the invention relates to a high efficiency and high torque electric motor to develop high yields of torque per the amount of energy consumed.

Background of the Invention

Early development of motors dates back to the mid 1800's when pioneer inventors such as Thomas Davenport developed the first real electric motor. Prior to that, early motion devices were created by electrical scientists such as Michael Faraday and Joseph Henry. Although the early development of motors could only create spinning disks or levers, they were important discoveries and built a foundation for development of better motors for the future generations. The development of electric motors leads to advancements in other electrical devices such as generators as well. In the late 1800's, pioneers of the generator figured out that running a motor backwards could create pulses of electricity and this lead to future development of generators to replace batteries as an energy source since batteries were not an economical way to power the needs of society.

Modern electric motors can be powered by either alternating current (AC) or direct current (DC). Originally, DC motors were developed and still to this day use the power of the electromagnetic field. AC electric motors use electromagnetic induction. With electromagnetic induction, an electromagnetic force across a conductor is exposed to a time varying magnetic field and when a magnet is moved toward a conductor, an electromotive force is created. For the material used in these motors, insulated copper wires are most common and wound around a core to create and receive electromagnetic energy in both DC and AC motors. Copper's exceptional current carrying capacity and excellent conductivity makes it the element most commonly used in electrical wiring and electromagnetic energy generation not only in all small motors, but large generators as well. In addition, the strength of a motor varies upon voltage and the length of the wire coils. The longer the wire coils, the larger the electromagnetic field, hence the more to power to turn the rotor.

Although today, with the advancement of motor technology and creating more energy efficient motors, most motors still share some similar parts. The majority of motors contain a stator or an electromagnet which can be wound with insulated wires. A rotor coupled with a shaft sits in the middle of the motor and is exposed to the electromagnetic field created by the electromagnet or stator. To rotate the shaft, its poles are attracted and repelled by the poles of the electromagnets or stator. Motor efficiency is critically measured and the efficiency is calculated by the power that the motor produces. The heat lost during operation of a motor reduces the power output of the motor.

When analyzing DC motors in particular, there are many different types of DC motors and yet two of the more common ones are brushed and brushless DC motors. With brushed DC motors, brushes are hooked up to an external power source and charge a commutator inversely in polarity to a permanent magnet. This causes an armature to rotate within an electromagnetic field. Brushed motors are used in several applications and the speed of the motor is easily controlled with the level of voltage applied. Further, a unique style of a motor which is called a pancake style motor can use fibers to brush along the current when initially providing power to an electric motor. Pancake style motors were originally designed in the 1950's and the brushed Pancake motor evolved from the original printed armature concept. Today, the design has an ironless disc with coils using copper instead of printed circuit board. As the disc spins, the brushes are in direct contact with the copper conductors and this removes the need for a commutator. A magnetic field allows the disc to rotate which is produced by permanent magnets in the rear and front end plates which enables the lines of flux to pass and return through the armature coils. An example of a pending patent for a pancake electric motor is described in U.S. Pat. No. 8,373,319. In this design, the construction of circuits is by phase buses for carrying large currents in the motor or generator and the details of the design are described. Further, the invention explains some of the basic principles of the pancake generator with the advantages of the design compared to standard motors.

With the growing need for more energy efficient power generators, a high efficiency motor for energy and cost savings is needed now more than ever. And to advance on current pancake style electric motor designs such as U.S. Pat. No. 8,373,319, a high torque electric motor with multiple stages of power production can greatly benefit a society that highly depends on electricity.

SUMMARY OF THE INVENTION

Accordingly, the invention is a high torque and energy efficient electric motor. It is an advantage of the present invention to develop high yields of torque per the amount of energy consumed. With a larger diameter shaft and shortened length, the design of the motor is "pancaked." With high torque, the electric motor can operate from the principles of repelling/attracting magnetic fields. Two embodiments of the invention for the high torque motor are designed to be energy efficient utilizing lifting design electromagnets, and low current flow in relation to the magnetic field produced is key element 1. Utilizing leverage within the motor to produce high levels of power with minimal electrical power consumption is key element 2. The housing electromagnet face will be in the shape of an ellipse in order to manipulate the magnetic fields thus creating rotation of the motor shaft is key element 3. The ability to time the individual electromagnet energization to further lower power consumption at lower RPM's is key element 4. The ability to operate with various preselected options is key element 5. The ability to operate with a multistage system is key element 6. Low voltage low current flow electromagnets are key 7. Therefore, one embodiment is a single stage high torque output motor while yet another embodiment is a multi-stage high torque output motor.

A single stage high torque motor comprises various styles of magnets/Iron which are mounted to the radius of a motor shaft. Electrical power is provided by different types of external electrical power sources and possibly utilizing brushes to transfer electrical power and ground to the shaft electromagnets. The motor can be designed to operate on AC or DC. Permanent shaft magnets can be used in lieu of electromagnets as well. They would not require electrical power to connect to the shaft magnets. The electromagnets are mounted within the motor assembly. There are several ways to increase the torque of the motor including: increasing the lever or distance from the shaft center to radius of shaft magnet; increasing the current flow or voltage from the external power source; or increasing the number of coil windings or the overall electromagnetic surface area. Each of the housing electromagnets will be on the circumference of the motor assembly while the inner radius of the electromagnet will be in the shape of an ellipse. This assembly configuration will naturally cause rotation of the shaft due to repelling/attracting magnetic field/s as like fields will be opposed between the shaft magnet and housing electromagnet. Thus, the repelling effect of the magnetic field causes rotation of the shaft. The application of attracting like fields between shaft magnet/electromagnet and housing electromagnet will cause rotation within the ellipse shape between the two surfaces. The High Torque Motor can operate in the reverse direction if application requires by changing polarity of housing electromagnets, which would cause attracting fields. The application of specific motor would dictate the options the operator may choose to best fit the needs of the requirements.

Another embodiment of the high torque motor invention is to integrate a multi stage high torque output motor. This application of adding multistage to the motor allows for different applications for size and power requirements for a desired motor. In a multi stage closed loop leveraging electromagnetic motor, the objective is to provide operation without an outside power source for a limited period of time; initially an outside power source is required to start the motor. To enable this operation, the multi stage power plant can be coupled to a generator system with a gear box some applications may require an integral generator system within the multi stage high torque output motor. Electrical power can be provided by a generator system while the speed of the high torque motor can be controlled by a current regulating device. In the multistate high torque motor each stage of the motor can be operated separately or in conjunction depending on key factors such as load on the motor and redundancy of systems for vital motor operations. The operation, just as described in a single stage high torque motor, have an assembly step where electromagnets or iron are mounted to the radius of the motor shaft and can receive electrical power from an external power source utilizing brushes to transfer electric power. The various stages in the motor can play critical roles during operation. When stage 2 is operating at speed stage, stage 1 will be de-energized. A closed loop leveraging electromagnetic motor such as the one briefly described, can continue to operate and produce electricity for a limited period of time until the system is selected to the OFF position. The end result is a system that is designed to produce electricity without an external power source for a limited period of time when the system is operating. Again, the application requires permanent, electromagnets or iron mounted to the shaft and can receive power from an external source through the use of brushes mounted around the circumference of the motor shaft. The motor utilizes leverage from the repelling/attracting magnetic forces to rotate the shaft. Each electromagnet can be housed in a position and can operate from an electrical circuit, thus, they may be energized continuously if desired.

The advantage is the design of the high torque motors can produce high torque output and low power consumption. Various power generating devices such as generators can be used along with transformers to provide control power and voltage requirements in collaboration with the high torque motor during operation as well.

BRIEF DESCRIPTION OF THE DRAWINGS

FIG. 13 depicts a fail safe option of the electrical circuit for controlling the fail safe feature of isolating the two electrical systems ref FIG. 11 for diagram. The two sources for electrical power are completely isolated from one another via electrical contactors or relays. Example: in the event electrical system #1 failed for any reason the battery isolation contactor would be opened isolating the two systems and the motor/s would continue to operate on the #2 electrical system. The particular diagram is designed to only allow one electrical source to power the motor/s at a time. When failure is detected it will revert to other system for electrical power. The system can also be configured the have more control over system to allow the operator to utilize both electrical systems if desired. The system can be configured in various way depending on application.

DETAILED DESCRIPTION OF THE INVENTION

Figure 1:
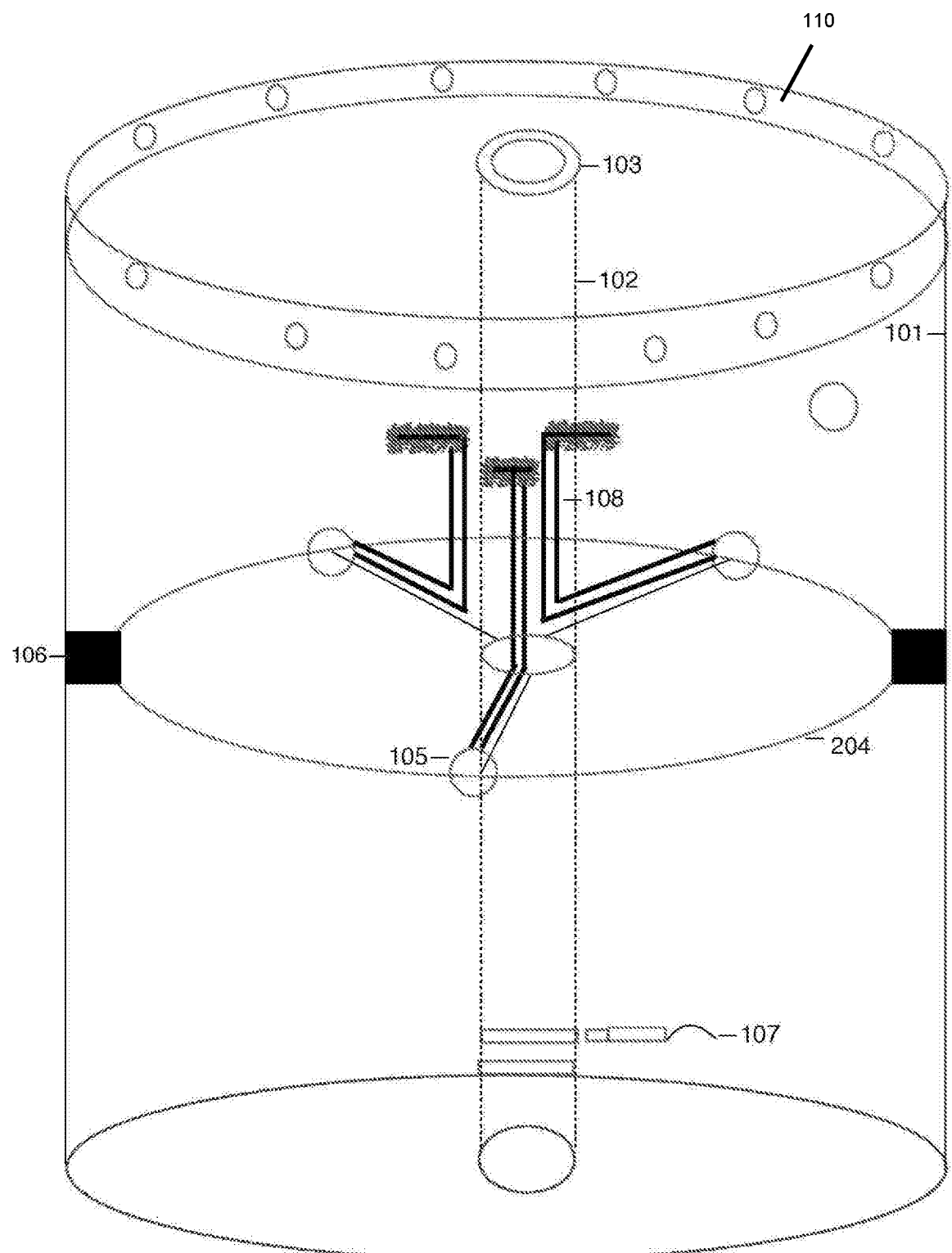
FIG. 1 is a schematic illustration of the single stage high torque motor according to this invention.

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation or restriction of the scope of the invention is thereby intended. Any alterations and further implementations of the principles of the invention as described herein are contemplated as would normally occur to one skilled in the art to which the invention relates.

Figure 2:
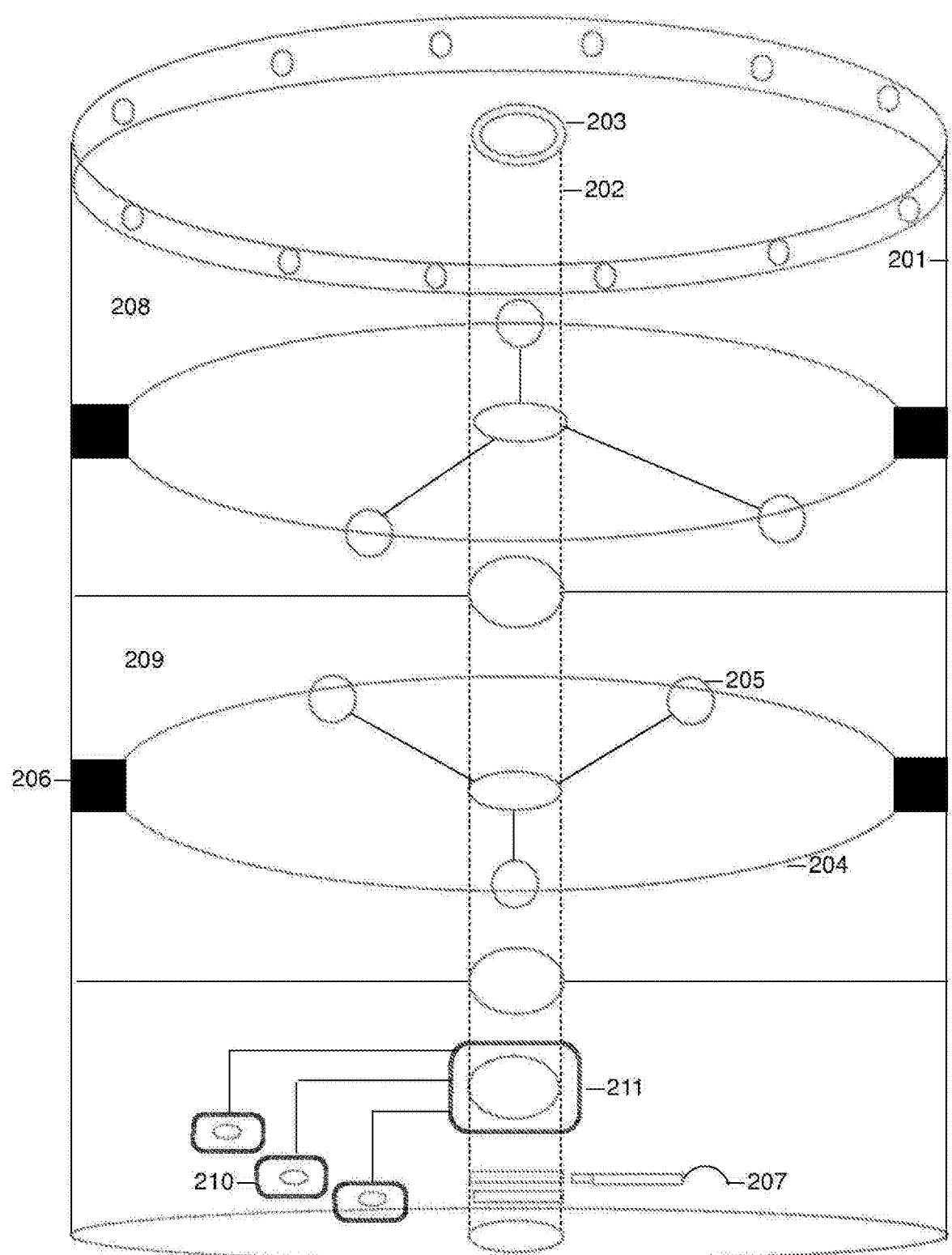
FIG. 2 is a schematic illustration of two stage high torque motor according to this invention.
Figure 3:
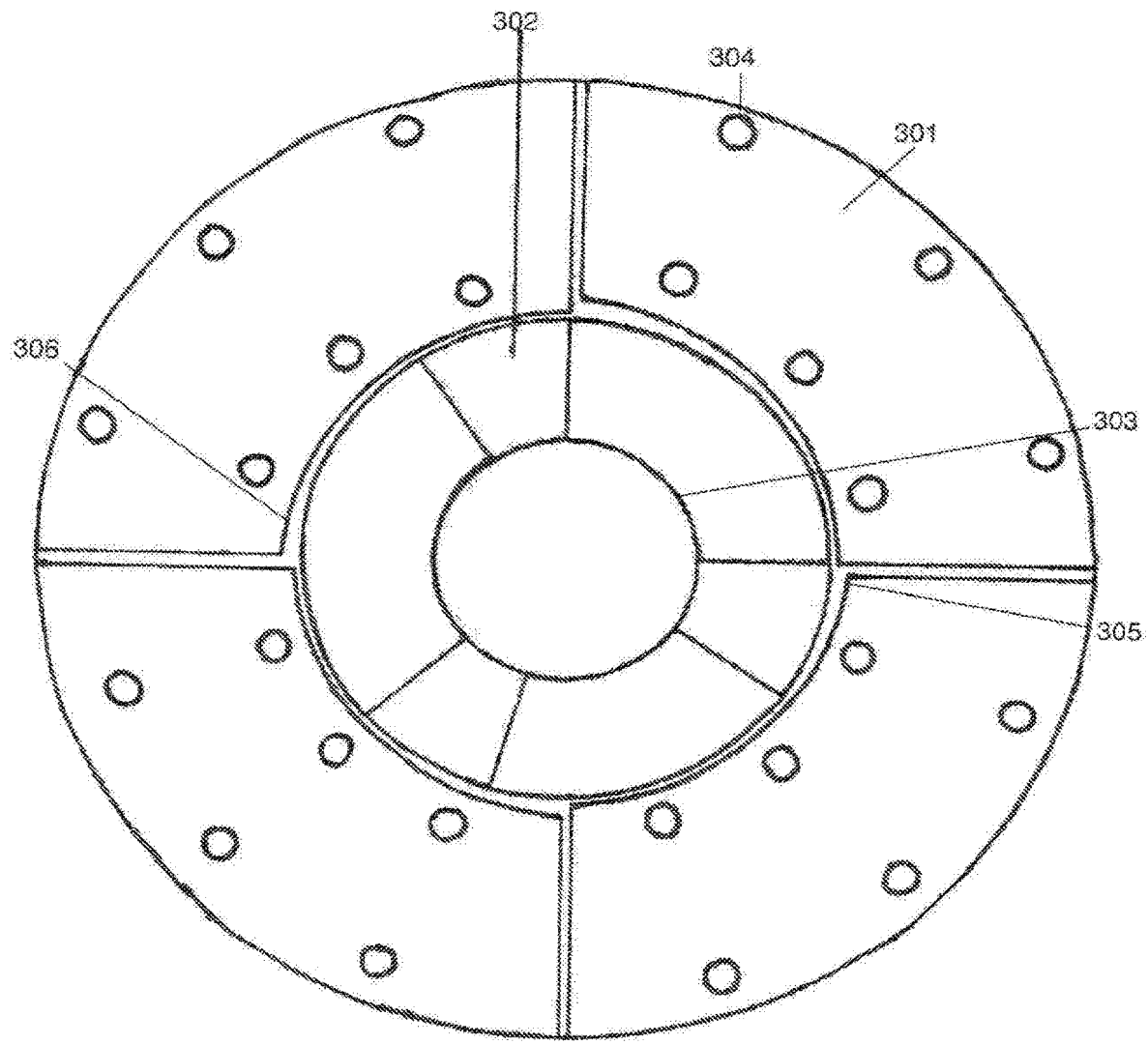
FIG. 3 is a schematic illustration of a cross-sectional view of the high torque motor according to this invention.

The invention provides a high torque electric motor that includes one or more electromagnetic assemblies which are in pancake or disc shape and are paralleled to each other as illustrated in FIG. 1 through FIG. 5. Each of said assemblies includes a rotor and a stator. The rotors are mechanically coupled to a shaft which delivers mechanical power. The stators are mechanically coupled to a housing that holds the stators and the shaft. Each of the rotors is in a cylindrical shape coaxial with the shaft and holds at least two electromagnets including windings, and each of the electromagnets incorporated in the rotor has one magnetic pole facing outwardly facing to the inner side of the stator. The stator is in an annular shape coaxial with the shaft and holds at least two magnetic units which can be either permanent magnets or electromagnets. As illustrated in FIG. 3, each of the magnetic units 301 is in an annular sector shape consisting of an intercepted arc of a first circle merged with the stator's outer edge, two radius sides, and an inner side. The inner side is an intercepted arc of an ellipse, a parabola, or a second circle with a radius larger than the first circle's radius, such that one of the two radius sides is longer than the other radius side and an air gap between each magnet unit and the rotor increases gradually from the magnet unit's longer side to its shorter side. The magnetic units are evenly coupled in the annular shape and each magnet unit's longer side is adjacent to a neighboring magnet unit's shorter side.

In the implementation where the magnet units are permanent magnets, when electric current travels through the electromagnets in the rotor, magnetic fields of the electromagnets interact with magnetic fields of the permanent magnet in said stator and generate a torque that turns the shaft.

In the implementation where the magnet units are electromagnets, when electric currents travel through the rotor and the stator, the magnetic fields of the rotor interact with the magnetic fields of the stator and generate a torque that turns the shaft.

First Preferred Embodiment

FIG. 1 illustrates a side view of a single stage high torque motor according to this invention. The motor includes a stator which the housing 101 and a rotor which is a cylindrical shaft 102 coupled with magnets. Bearings 103 are mounted to the top and bottom of the shaft 102 to reduce friction and to allow the shaft 102 to rotate. Inductors 108 provide electrical energy to the shaft's electromagnets 105. Housing electromagnets 106 having the shape of an annular sector are mounted to the circumference of the housing. In this position, the housing electromagnets can work in repelling/attracting the electromagnets on the circumference of the shaft and the motor utilizes leverage from the repelling or attracting magnetic forces to create the rotation of the cylindrical shaft. The distance from the radius of the shaft magnet to the center of the motor shaft is calculated to produce the torque required for the application. And the torque of the motor can be increased by increasing the lever, which is the distance from the center of the shaft to the radius of the shaft magnet. A brush assembly 107 is also used to provide power from an external power source to the shaft's electromagnets for initial startup of the motor. With an external power source (not shown in FIG. 1), the brushes can transfer electrical power and ground to the shaft electromagnets. As yet another optional feature, to provide electrical power to the electromagnets 105, an internal power source called a permanent magnetic alternator (PMA) 108 can be used. The coil of the electromagnet can be connected to PMA 108 wire to induce the electric current to help rotate the shaft.

One key feature of the single stage high torque motor is the circumference of the motor assembly which has electromagnets as described above. The electromagnet's inner radius is shaped like an ellipse 105. These electromagnets in the shape of an ellipse are specifically designed so that when the shaft magnet nears the permanent electromagnet 106, it will have a stronger repelling or attracting magnetic field (depending on application). Further, when it is at the end of range in the electromagnet, the field is the weakest. In the application of attracting fields, the motor would operate in a reverse direction the field would be strongest as distance between shaft magnet and housing electromagnet gets closer. The application of the high torque motor is controlled by the distance between the electromagnets, electrical current flow, voltage magnet surface area, and number of coil windings in the electromagnets. The electromagnets for this application may be bipolar and can contain same basic style with multiple poles or flat faced.

As described above, the rotation of the shaft due to the repelling magnetic fields of the housing electromagnets and shaft electromagnets causes the shaft to rotate. An air gap between the shaft magnets/electromagnets and the housing electromagnet 106 will gradually increase the air gap as the shaft electromagnet passes the housing electromagnet 106 field (this is to form repelling fields). The application that requires the motor to operate with attracting fields, the air gap will gradually decrease. The electromagnets 106 may have a dedicated electrical circuit control the timing of energization of each housing electromagnet independently to achieve more efficiency. Further, the housing electromagnets may be continuously energized depending on application

Second Preferred Embodiment and Best Mode

FIG. 2 is an illustration of another embodiment of the invention. FIG. 2 shows a front view of a multi stage closed loop electromagnetic motor. In this application, the motor contains either an internal permanent magnet alternator or coupled to a generator system via a gear box. This depends on if the application requires a gear box for speed of the motor requirements. Since the second embodiment is a multi-stage motor, the first stage is designed to operate just as described in detail in FIG. 1. The exception is that when the multi-stage motor is at operating speed, the second stage provides electrical power from the generator (not shown in FIG. 2) which is coupled to the multi-stage motor. In addition, a speed control device can be located in the electrical circuit between the generator and the second stage of the multi-state motor.

One novel aspect of the multi-stage motor is that the speed of the high torque motor can be controlled with a current regulating device; thus the multi-stage motor can operate the individual stages separately or in conjunction depending on the load on the motor or for redundancy for vital motor operations.

Similar to FIG. 1 as described in detail above, the motor shaft 202 located at the center of the housing 201 which is at minimum 1 inches in diameter consists of either permanent magnets or electromagnets. A set of bearings 203 at the top and bottom of the motor shaft allows for less friction and smoother rotation of the motor shaft 202 as well. This application that requires electromagnets mounted on the shaft can receive electrical power from internal PMA system (permanent magnetic alternator) or from the brush assembly to transfer electrical power and ground to the shaft's electromagnet's 205 which are mounted within the motor assembly's housing 201. Just as in FIG. 1, the ring 204 for the magnetic pickups is mounted around the circumference of the motor's shaft 202. Further, a mounting flange or flywheel is mounted to the cylindrical shaft. This allows the shaft to connect to the housing magnets surrounding the shaft and shaft's electromagnets.

In this configuration, each shaft electromagnet has a dedicated set of brushes to transfer electrical power and ground to each shaft electromagnet. Again, the motor utilizes leverage from the repelling or attracting magnetic forces. Ellipse shaped electromagnets 205 mounted around the circumference of the cylindrical shaft, allow for the shaft's electromagnets when near the housing electromagnet 206 to create a stronger repelling magnetic fields. And, when the shaft's electromagnets 205 are at the end range, the electromagnetic field is the weakest (Attracting magnetic fields work in opposite direction as the repelling fields). One example for operation requires three permanent magnets and four electromagnets for assembly of the motor according to this invention.

The air gap between the shaft's electromagnets 205 and the housing electromagnet gradually increases as the shaft's electromagnets 205 pass the permanent electromagnets 206. This in turn has a repelling or attracting effect (depending on application) and the rotation of the motor shaft is created by this configuration. Each of the electromagnets 206 may have a dedicated electrical circuit controlling the timing of the energization of the housing electromagnet. Also, the housing the electromagnets can be continuously energized depending on application while the minimum number of electromagnets required for operation is one electromagnet on the circumference of the shaft.

In Stage 2 within the housing of the multi stage motor, while the motor is at operating speed stage, Stage 1 is de-energized. This closed loop leveraging motor continues to operate and produce electricity for a limited period of time until the system is selected to an OFF position by an electrical circuit (not shown). In the example as shown in FIG. 2, the motor has two stages, i.e., Stage 1 (209) and Stage 2 (208) and provides dynamic energy when the system is operating and selected to the ON position. The motor can also have more stages by incorporating more pancakes in the rotor.

One important element is that an outside power source is required to get the system turned on and operating and the speed of the motor is controlled by regulating the amount of electrical current flow to the electromagnets.

In one application, an external shaft can be integrated with the motor. The external shaft extrudes out in order to couple equipment to the motor. Also a fan is mounted to the motor shaft end internal to the motor to provide cooling. Another additional feature may be a gear box 211, which is controlled by distributors 210. In some desired applications, a gear box 211 may be necessary to control ratios of torque output. With the present invention, this feature is possible as well and power can be transferred from the external power source to operate the motor with the brush assembly 207.

FIG. 3 illustrates a cross-sectional view of the motor that includes a stator and a rotor. The stator includes a shaft 303 and 3 electromagnets 302 coupled to the shaft 303. The shaft 303 is in the center of the assembly and can rotate clockwise or counterclockwise. The stator includes a housing that holds 4 identical permanent magnets 301 that are coupled to a base. While only four permanent magnets are shown for simplicity, the invention can have additional housing electromagnets. Holes are milled out of the magnets 301 and rods (not shown) are pushed through the holes 304 while nuts and bolts (not shown) are able to hold the housing permanent magnets 301 together. Each housing magnet 301 is specifically designed to have an ellipse shape 305 facing the rotor having permanent magnets or electromagnets 302. With this design feature, the electromagnetic flux created between the shaft magnets 302 and housing magnets 301 forces the shaft to rotate consistently by keeping the electromagnetic field consistent between the housing electromagnets 301 and the shaft magnets/electromagnets 302. A gap of 0.140 inches is the maximum distance 306 between the electromagnets and the permanent magnets (for this illustration, other applications may require other dimensions). This is specifically designed to generate optimal rotation of the shaft for the maximum torque output during operation. The electromagnets have integral coils wrapped around an iron core in between the plates. The coils have each end of wire exposed towards rear of the magnet and are soldered to the wire harness that are secured with high temp harness ties and supported with support blocks and high temp ties to eliminate chaffing of the harness. The harness of the individual magnets has dedicated terminal studs extruding through the cover of the motor, not depicted for simplicity of drawing.

Figure 4:
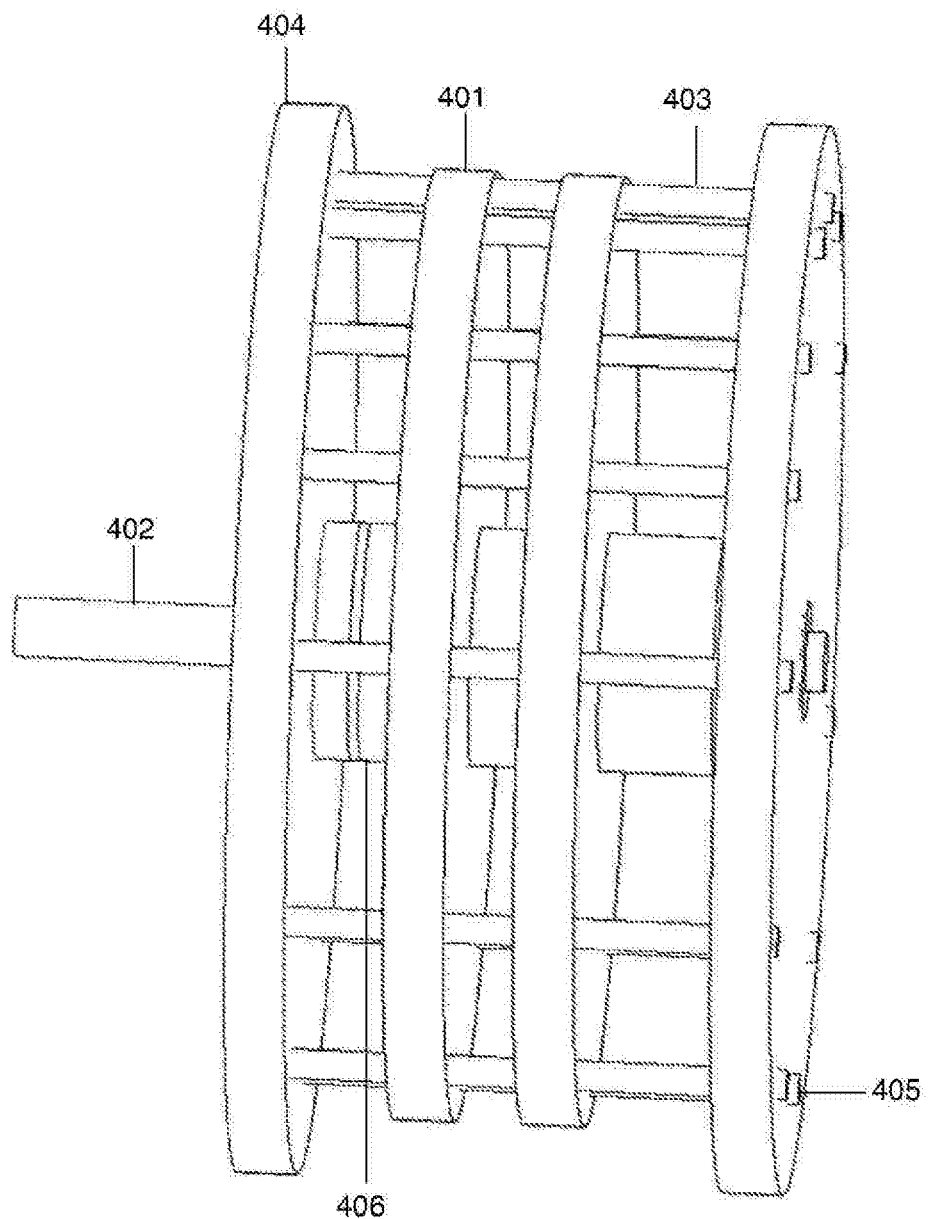
FIG. 4 and FIG. 5 are perspective views of the internal structure of the high torque electric motor invention according to a typical embodiment of this invention.
Figure 5:
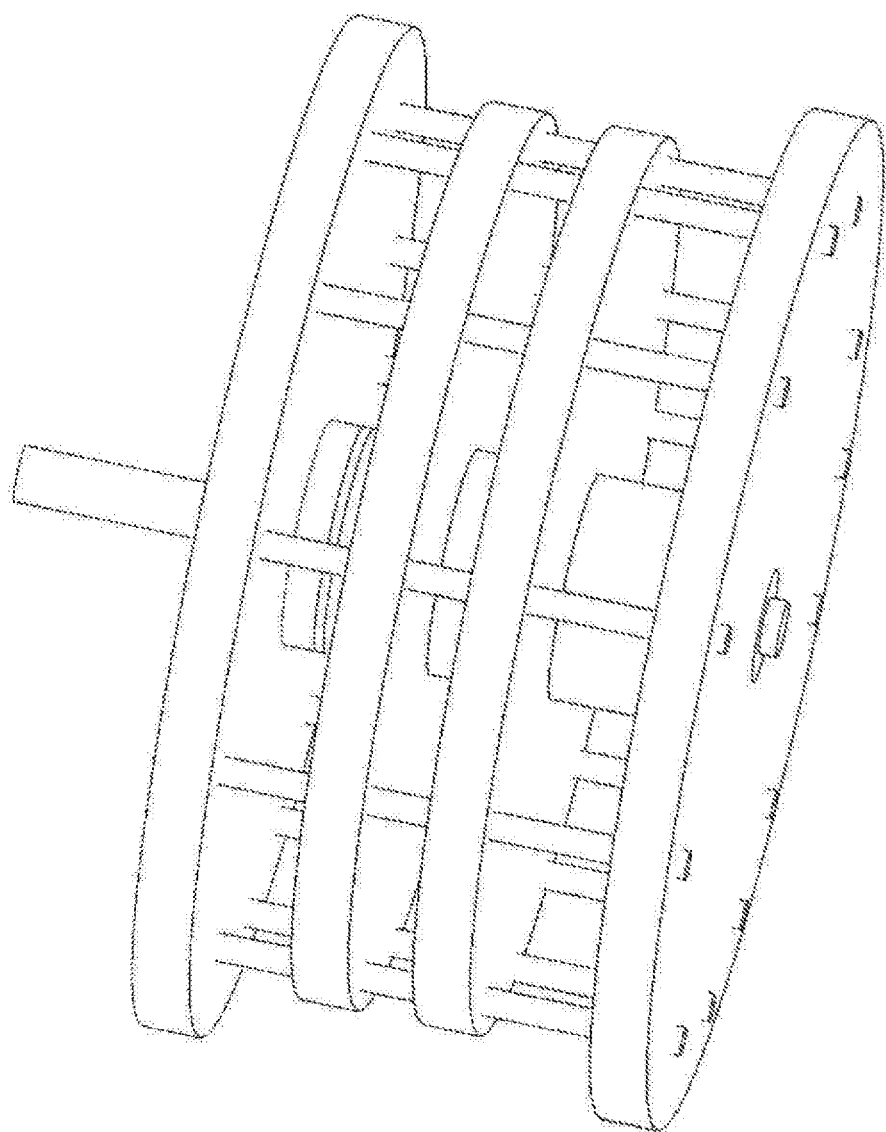

FIG. 4 and FIG. 5 illustrates a perspective view of the pancake structure of the high torque motor according to the invention. In this view, four bipolar magnets 401 are spaced two inches apart while surrounding the shaft 402. The shaft 402 has an external section which extends beyond the assembly for coupling with other devices. Rods 403 are pushed through holes which are milled out of the housing magnets 401 and the magnets maybe drilled partial way through and taped with correct thread count. Nonferrous end plate 404 and nonferrous end plate 405 are shown with bolts at the bottom of one plate to hold the rods 403 in place. A distance of 2 inches separates the two permanent magnets in this particular assembly configuration. Electromagnets/Permanent magnets 406 surround the shaft 402 while the electromagnets/permanent magnets are bolted to the shaft. Copper wire (not shown) is coiled around an iron core located in between the plates to transfer electricity for initially charging the electromagnets, which in turn, spin the shaft 402.

Figure 6:
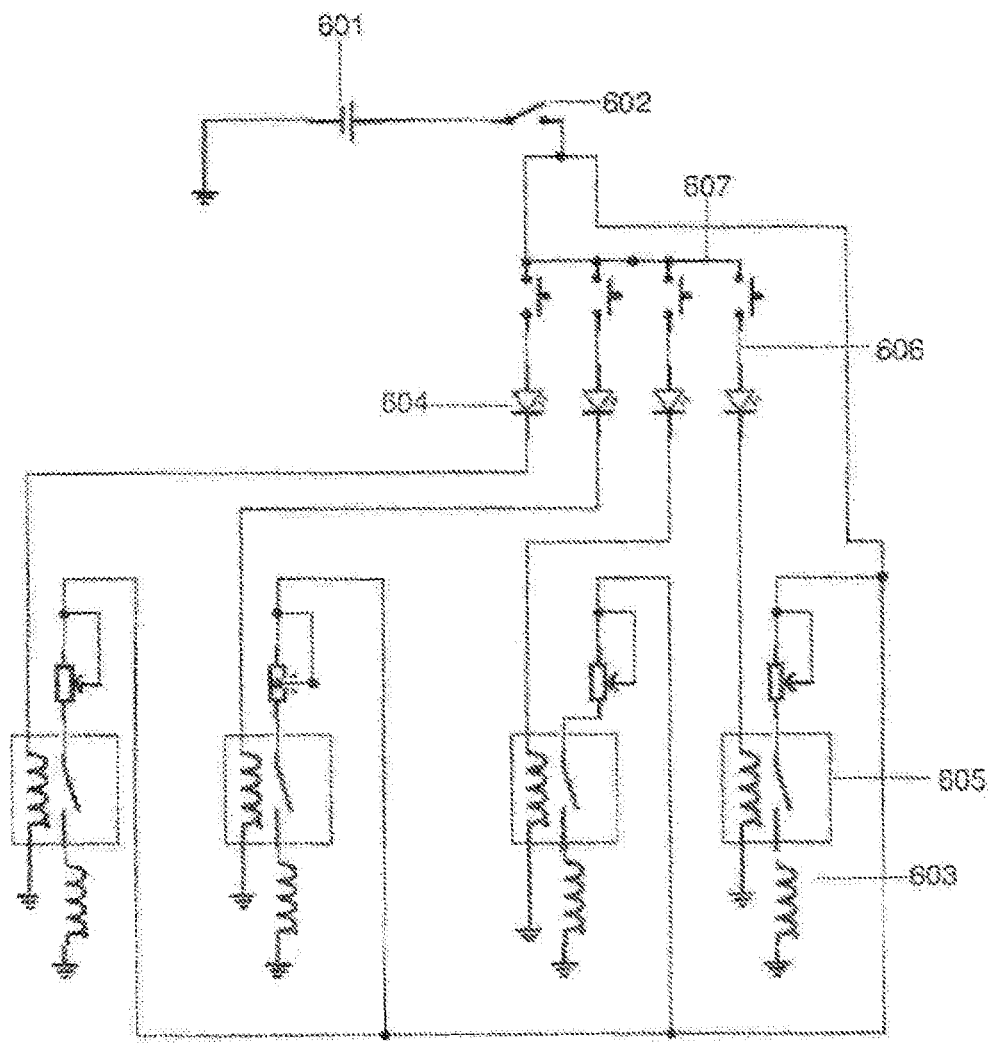
FIG. 6 is a typical electrical circuit diagram illustrating a timing device for operation of the electromagnets.

FIG. 6 is a diagram for an electrical circuit which is incorporated with the high torque electric motor. A direct current battery is required to energize the electromagnets, however AC current may also be used depending on the application. Further, a transformer maybe used in lieu of battery to connect to the electrical outlet as well. For simplicity of understanding the invention, a switch 602 is connected to the DC current battery 601 for ON/OFF when activating the circuit. A timing device 607 which is linked to the four electromagnets 603 and timing diodes 604 are routed for each of the quantity of four electromagnets 603. Each electromagnet can be controlled individually for charging depending on the application and amount of torque required for the shaft to turn out work. The electrical circuit may have a dedicated current regulating device 606 for the individual electromagnets or the electromagnets may share one current regulating device. Depicted in this FIG. 6 is a circuit with individual current regulating devices 606.

The timing diode 604 can be used to aid timing the motor with the visual LED illuminating when the electromagnet is energized. Further, a timing relay 605 and timing rheostats, can be utilized as current regulating devices to control speed of the motor. When the timing diode 604 is connected with a rheostat and the rheostat is used to determine the charged energy required for each of the electromagnets 603 per the application. This set of electromechanical components is harnessed together and hooked up to the coiled copper wires inside the housing which contains the electromagnets. The battery 601, ON/OFF switch 602, timing diodes 604, and timing relays 605, are external components which are installed outside and away from the high torque motor assembly. They are connected to the motor with a harness assembly included several wiring cables as mentioned above. A processor (not shown) can be used to control the timing relays to activate each electromagnet 603 for a particular application.

Figure 7:
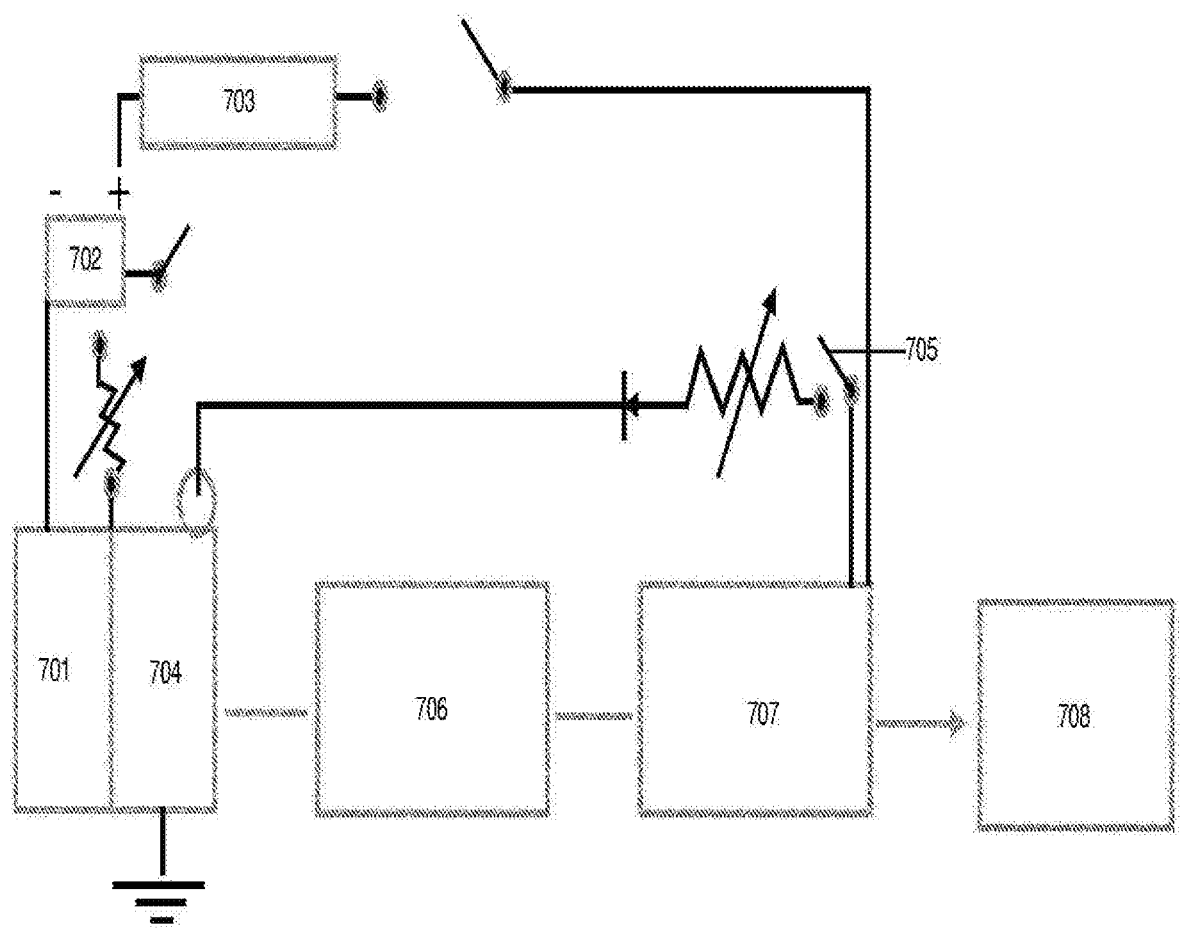
FIG. 7 is yet another electrical diagram presenting various first and second stage of the motor along with several external electro-mechanical components which are needed to operate the high torque motor.

FIG. 7 is a block diagram illustrating certain key components in the assembly of the high torque electric motor. The first stage of the motor 701 obtains initial startup power from the direct current battery 702. A charger 703 may be implemented to the battery to help charging the battery during the operation of the high torque electric motor. The second stage of the motor 704 may have its own ON/OFF switch 705 to allow for separate operations in relation to the first stage of the motor 701. If a gear box 706 is required to control ratios of the mechanical device per a desired application, it may be implemented and connected to first or second stage of the motor. Further, if a generator 707 is implemented here, it can be connected to the first or second stage of the motor as well. The overall power output 708 is designed to be more efficient than currently existing high torque electric motors.

In either of the two embodiments of the invention, a single stage high torque electric motor or multi stage high torque electric motor, a failsafe option can also be implemented for a variety of applications during operation of the motor.

Figure 8:
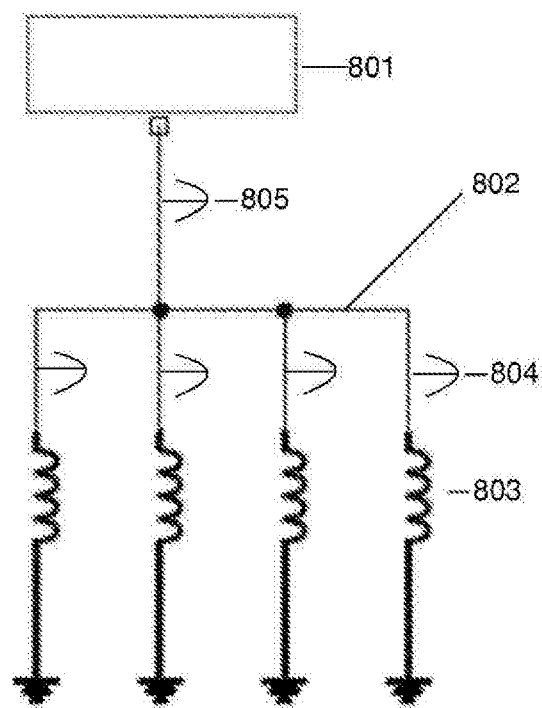
FIG. 8 is an electrical diagram of a control circuit for the individual sections within the high torque motor.

Single stage high torque motor is designed to operate with failsafe feature to increase reliability for motor. The housing magnets of a single stage electromagnets are wired in parallel with the housing magnets located but not limited to 180 degrees apart. In this example the single stage motor has four housing magnets and a short circuit with in one of the housing magnet coils was sensed by a circuit breaker. The circuit breaker removes electrical power from the housing electromagnet circuit and electromagnets 180 degrees apart in order to maintain balance within the motor. In FIG. 8's electrical diagram a power source 801 is connected to an ON/OFF switch 805; a buss bar 802 which helps current to travel to the electromagnets 803 is electrically connected to the power source 801 and the ON/OFF switch 802. The circuit breakers 804 are electrically connected between the buss bar 802 and electromagnets 803 to help activate the failsafe feature if the application requires a failsafe mode.

Figure 9:
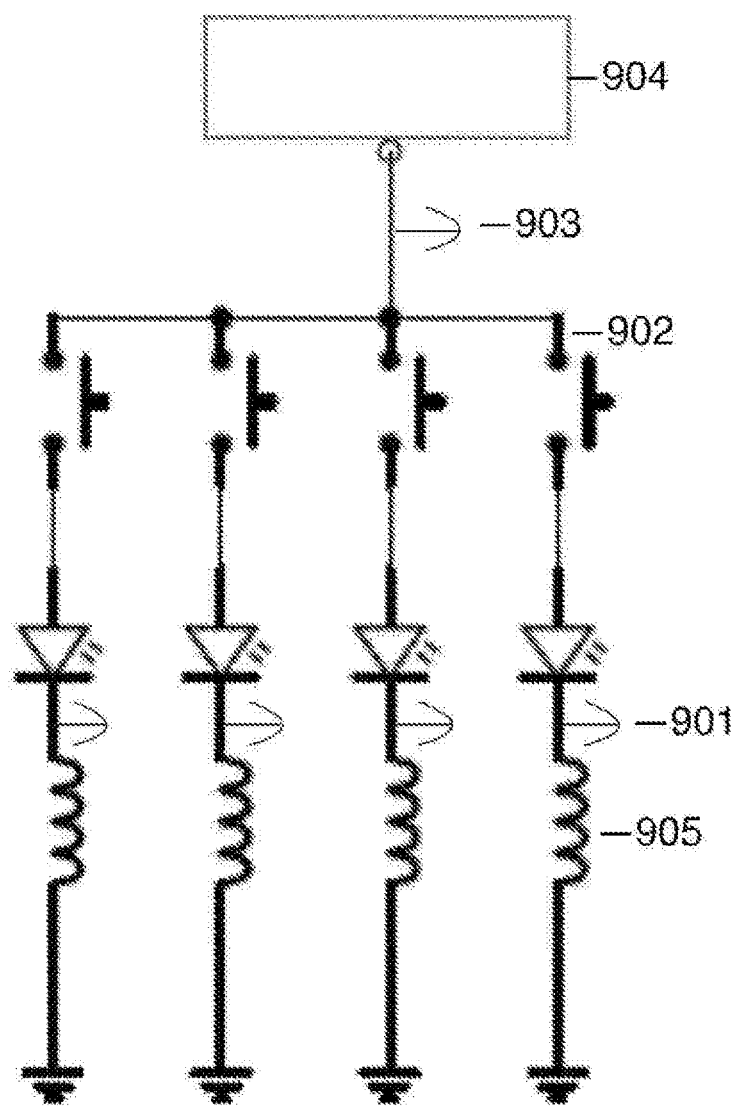
FIG. 9 is an electrical diagram of a control circuit for the individual sections with a high torque motor.

Multi stage high torque motor failsafe features are designed to isolate electrical failures to a particular motor section or circuit without compromising the entire motor operation. Each housing electromagnet within each section has a dedicated circuit breaker 901 which is shown in FIG. 9 that will trip when a short is sensed. Depending on the speed and application of the motor, the operator has the ability to isolate the entire section via a main circuit breaker for the section. The failsafe feature is an option; the motor can operate without the failsafe feature also. As shown in FIG. 9, a power source 904, such as a DC battery is initially used to provide power and a timing device 902 is electrically connected to the power source 904. An ON/OFF switch cycle circuit breaker 903 can activate or deactivate the entire electrical circuit of FIG. 9 depending on the application of the user. The entire electrical circuit and electrical components described are connected to the electromagnets 905 on the rotor, i.e., the shaft of the high torque motor device.

It is an objective of this invention to increase the efficiency of the motor by utilizing low voltage DC or AC lifting style electromagnets. Emphasis of these magnets is low voltage, low current flow, more turns of wire around core, but not limited to low voltage or low current flow. The optimal speed depends on the requirements of the application, but can be assembled to work at any RPM.

In some embodiments, a flywheel 110 can be attached to a shaft 102. In such embodiments, attachment can be via a flange connector and fasteners, friction fit, adhesive, or any other known and/or convenient connection devices, mechanisms, or methods. In other embodiments, a flywheel 110 can be integrated with a shaft 102.

Figure 10:
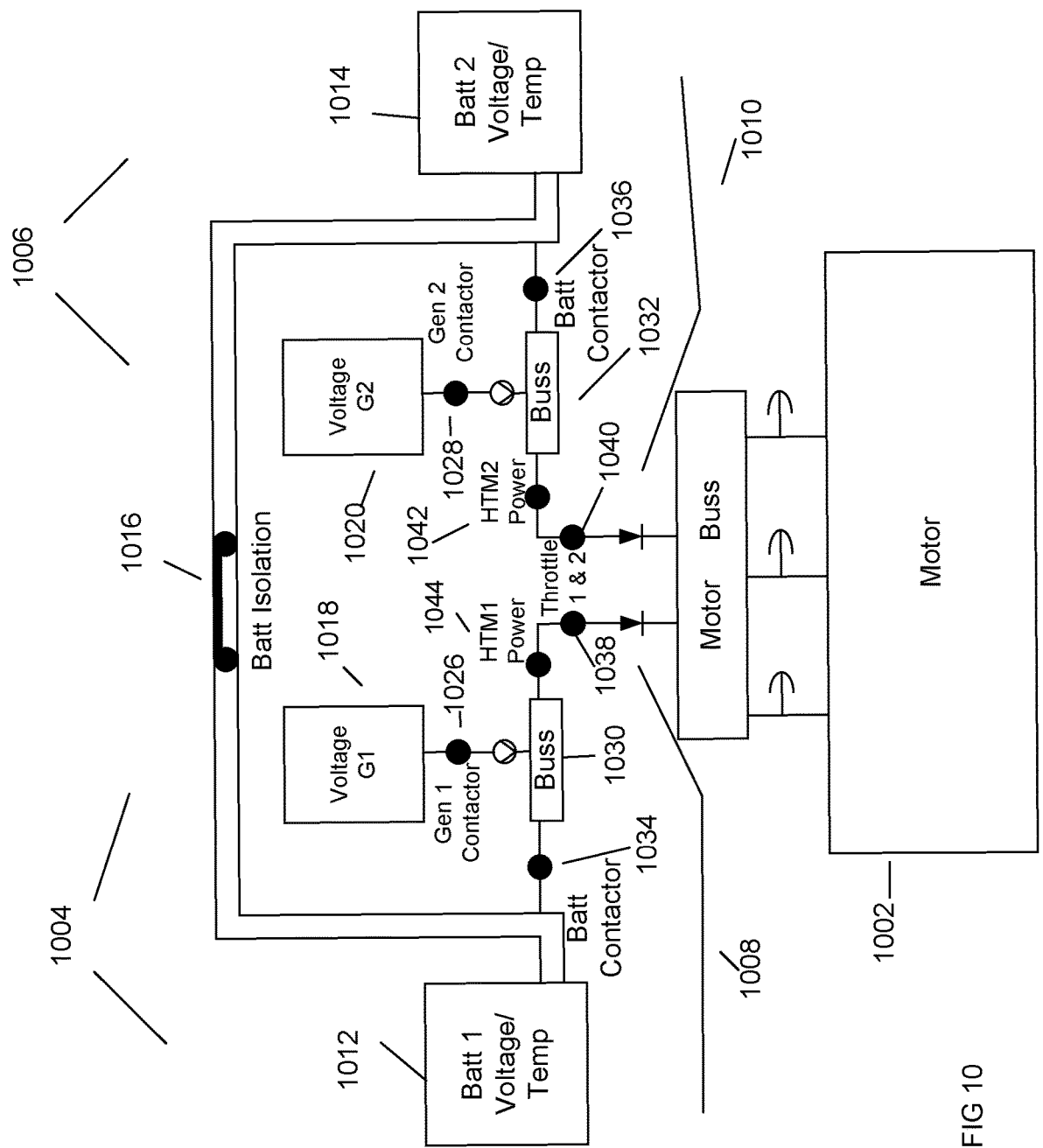
FIG. 10 is a diagram of an embodiment of a failsafe operating system for a high torque motor.

FIG. 10 depicts an embodiment of the present device further comprising a failsafe operating system. In such embodiments, electrical power to operate a multistage high torque motor 1002 can be provided from at least two power units. As shown in FIG. 1, some embodiments can have a first power unit 1004 and a second power unit 1006. In some embodiments, a power units 1004 1006 can consist of diesel or gas engines, generators and circuitry. In such embodiments, unit diesel or gas engines can be designed to operate with minimal consumption of fuel (i.e. at low RPM), with a minimal load. Each power unit 1004 1006, which can be relatively smaller than removed engines, can have at least two independent generator systems (a first generator system 1008 and a second generator system 1010) with independent batteries (a first battery 1012 and a second battery 1014 connected via an isolation contactor 1016, and a first generator 1018 and a second generator 1020. Generators 1018 1020 can be connected to an additional power unit (not shown), such as, but not limited to, a diesel or gas engine via a gear box in order to maintain efficient fuel consumption. In some embodiments, propulsion can be exclusively produced from multistage high torque motors 1002, at least two generators 1018 1020, with additional mounting pads for options, such as a hydraulic pump, or any other known and/or convenient device.

In such embodiments, as shown in FIG. 10, at least two independent generator systems 1018 1020 per power unit 1008 1010 can charge battery banks (a first battery bank 1012 and a second battery bank 1014) and provide electrical power directly to a high torque motor 1002. When an auxiliary unit is operating and generator systems 1008 1010 are selected to an "on" position, one system can provide charging power to battery banks 1012 1014. Some embodiments can control this via a three-position rocker-style switch (e.g., "GEN 1 ON, OFF, BATT 1 ON") or any other known and/or convenient types of switching devices. Such embodiments can provide a reliable system having many redundant features to minimize down time for repairs, and in turn increase operators' revenue while helping to eliminate global warming.

In some embodiments, electrical circuits within the power unit systems 1008 1010 can have each have a contactor (a first contactor 1026 and a second contactor 1028), a buss (a first buss 1030 and a second buss 1032), a battery contactor (a first battery contactor 1034 and a second battery contactor 1036), and a dedicated throttle (a first throttle 1038 and a second throttle 1040. In such embodiments, if a throttle system 1038 1040 fails in one section, throttle control can be switched to an alternate system to restore full function of a motor. In such embodiments, throttle current regulating devices can be wired in parallel of each other, or any other known and/or convenient configuration.

Independent motors can each have a dedicated throttle system with ability to control current flow to electromagnetic controls. Such devices can be Rotary Variable Differential Transformers (RVDTs), Linear Variable Differential Transformers (LVDTs), or any other known and/or convenient device. A throttle system 1038 1040 can be configured with a servo motor to control the position of a throttle lever, which can receive voltage and polarity from an optional Electronic Controller 1220. In such embodiments, an operator can remotely control a motor 1002 from an application on a mobile phone or tablet, rheostats, or any other known and/or convenient device. In such embodiments, RVDTs and LVDTs can act as a current transformer with a movable core in-between the primary and secondary windings controlling the output voltage.

When throttles 1038 1040 are in the "off" position, a switch can open to stop current flow to a current regulating throttle assembly. When a throttle 1038 1040 advances, a throttle switch can close and current flow can be routed to a primary wire coil of an RVDT or LVDT, thus producing an output voltage on secondary windings; voltage output can depend on throttle position. In embodiments utilizing a rheostat, a substantially similar style "off" switch can be used to remove current flow when in the "off" position. When advanced, variable resistance will change output voltage, and can thus regulate current flow to electromagnets.

In a first non-limiting example of a battery-charging mode of the present system in use, a first generator line contactor 1026 can be in a closed position. Electrical power can flow from a first generator through a first generator line contactor 1026 and come to a first buss bar 1030. An electrical flow can continue towards battery banks 1012 1014 passing through a first battery line contactor 1034. Electrical current can have the ability to travel directly to a first battery bank pass through an isolation contactor 1016 to charge a second battery bank. When a battery isolation line contactor 1016 is in the closed position a battery line contactor 1034 1036 from the other system must be open.

In a second non-limiting example of a power mode of the present system, electrical power can flow from a second generator through a second generator line contactor 1028 to reach a second buss bar 1032, and can continue to flow through a second power system line contactor 1042. Some electrical current can power a selected section of a multi-stage motor 1002, while other electrical power will flow through another power system isolation line contactor to power another section of a multistage motor 1002. An isolation line contactor can be opened at an operator's discretion, such as, but not limited to a high temperature situation in section 1 of a multistage motor 1002, in which power can be isolated to section 2. Such situations can also trigger an emergency mode (as described below).

In another non-limiting example of a power mode of the present system, a first generator 1018 can provide power to a multistage motor 1002. In such a mode, electrical power from a first generator 1018 can flow through a first generator line contactor 1026 and reach a first buss bar 1030. The current can continue to flow through a first power system 1 line contactor 1044; a first battery line contactor 1034 will be in an open position. Electrical current can be provided to a selected section of a multistage high-torque motor 1002. Electrical power can also pass through an isolation line contactor 1016 that can tie multiple sections (e.g., a first section and a second section) of a multistage high-torque motor 1002 together to enable them to run off of electrical power provided from a first generator system 1008. In such a scenario, a second generator system 1010 can be charging battery banks 1012 1014. In another scenario, a second generator system 1010 could have a failure tripping the a second generator 1020 off line. In some embodiments, an emergency mode can be initiated with loss of 1 or more normal mode generator systems.

In another non-limiting example of a battery-charging mode by a second generator 1020, a second line contactor 1028 can be in a closed position and electrical power can flow from a second generator 1020 through a second generator line contactor 1028, arriving at a second buss bar 1032. The electrical flow can continue towards battery banks 1012 1014, first through a second battery line contactor 1036. Electrical current can travel directly to a second battery bank 1014 and also have the ability to charge a first battery bank 1012 by passing through an isolation contactor 1016. An operator can control of the action of a battery isolation contactor 1016, such as, but not limited to, a situation where an operator notices a temperature and low voltage in a first battery bank 1012, indicating an internal short. In such a situation, a first battery bank 1012 can be isolated from a circuit without affecting the current function. When a battery isolation line contactor 1016 is in the closed position, the battery line contactor 1034 1036 from the other system must be open.

In another non-limiting example, a first battery bank 1012 can provide electrical power to a selected section (e.g., section 1) of a multistage motor 1002 if desired by an operator. If there is an indication that that particular generator system (in this case, a first generator 1018) is suspect of a failure it can be shut off and the corresponding battery bank (here, a first battery bank 1012) can provide emergency power.

In another non-limiting example, battery isolation operation can be implemented when a high temperature limit is reached in either battery bank 1012 1014. In a tied position (first battery bank 1012 and second battery bank 1014 connected), a battery isolation contactor 1016 can open automatically when a high-temperature condition is reached in either battery bank 1012 1014 in order to isolate a problem to only one system and continue operation. A ground can be provided to an isolation line contactor 1016 when a temperature switch reaches a predetermined temperature. A battery line contactor 1034 1036 will be normally closed and energized open. A battery isolation contactor can also open when an over or under voltage is sensed from the generator system charging battery banks 1012 1014.

In another non-limiting example, the present system can implement a multistage high-torque motor isolation operation. Multistage high-torque motor 1002 sections can be wired in parallel, and each section can have its own dedicated circuit breaker. In the event of a short circuit within a motor 1002, the entire system will not be compromised. The circuit breaker located within each independent motor section having a short will trip the breaker. A loss of multiple sections will not halt the motor 1002, which can continue to operate. Emergency power can also be engaged, at an operator's discretion, to increase power to complete a mission.

In another non-limiting example, the present system can also implement an emergency mode, which can be completely separate from a first generator system 1008 and a second generator system 1010. An emergency mode generator system can comprise at least one generator coupled to a small diesel engine to provide emergency auxiliary power. This operation power can be exclusively selected to the "on" position in the event a loss of a normal mode generator system or the loss of the normal mode auxiliary power unit (e.g., diesel engine). An auxiliary power unit can be selected by an operator engaging an auxiliary power generator switch. Electrical power from an auxiliary generator can flow through an auxiliary generator line contactor and provide electrical power to an emergency section of a multistage motor 1002. A multistage section of a motor can be designed to operate in conjunction with either one normal mode power system functioning or a complete failure of the normal mode auxiliary power unit. An emergency auxiliary system can be designed for dispatch reliability and critical missions, to complete a mission and repair as needed.

Figure 11:
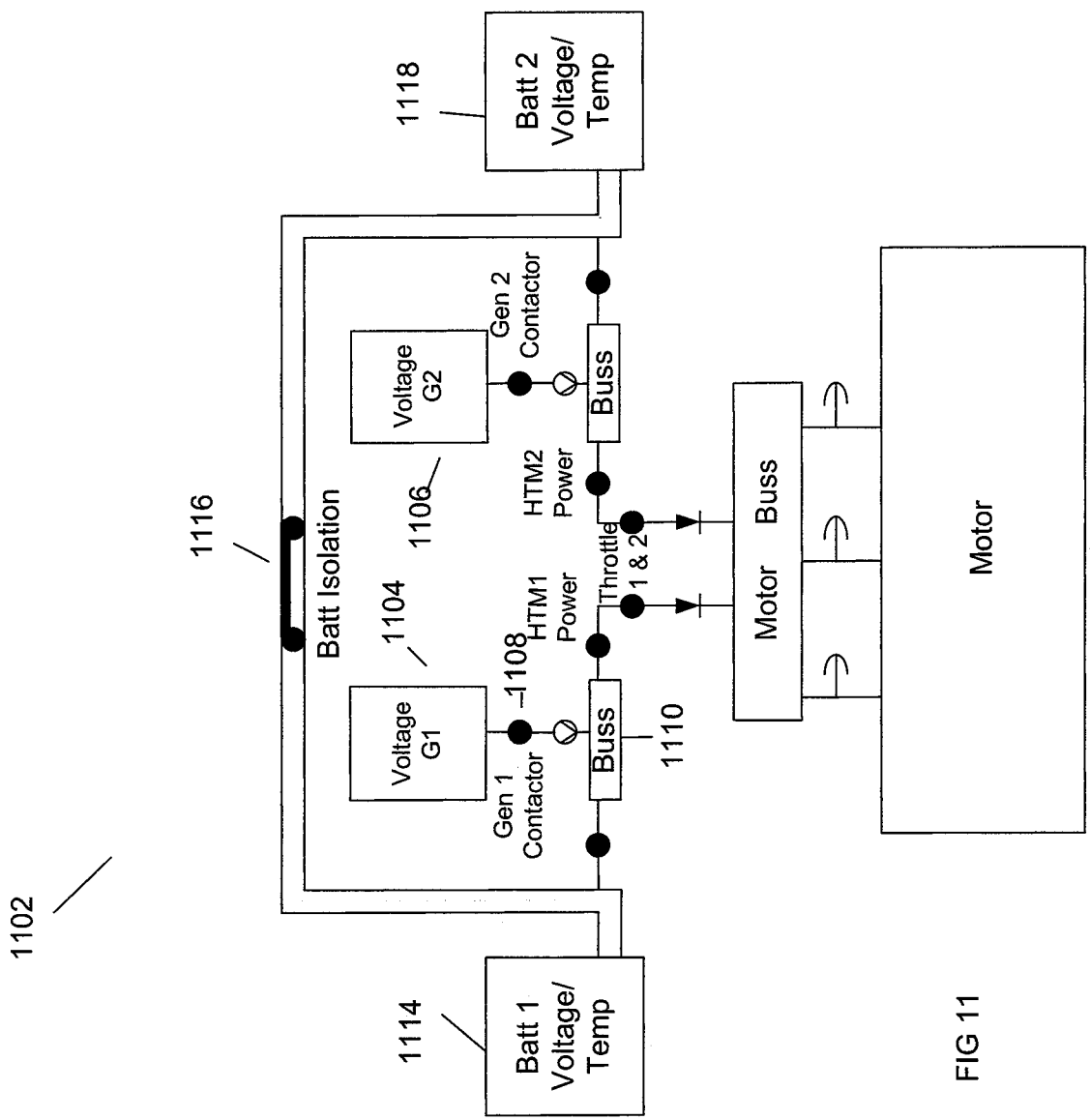
FIG. 11 depicts an embodiment of a user control panel interface.

FIG. 11 depicts an embodiment of a crew advisory panel interface 1102. In some embodiments, a panel interface 1102 can use a color-coding system to identify the generator systems, but in others can use any other known and/or convenient symbolic identification system. In such embodiments, for example, a first generator system image 1104 can be blue, a second generator system image 1106 can be yellow, and an emergency power unit (not shown) can be red. However, other embodiments can use any other known and/or convenient color, shading, or pattern scheme. For ease of operator understanding, each independent generator system 1008 1110 can be represented by its own dedicated color for the segments and components that can be affected by different switch positions.

As shown in FIG. 11, an advisory panel interface 1102 can comprise a simplified diagram of the electrical workings of the present system to facilitate use. In such embodiments, when a particular segment of the present system has voltage, sensors within the segments can transmit electrical signals to display the segment a predetermined color on an advisory panel interface 1102. In some embodiments, when a sensor in a segment does not detect a voltage the depicted segment can be gray representing no voltage and no current flow, but in other embodiments can display any other known and/or convenient visual. As a non-limiting example, a first generator system image 1104 can be depicted in blue when voltage is present. In such a situation, a line segment coming from a first generator system image 1104 can be blue; all segments from a first generator system image 1104 can be blue to a first battery image 1108 and over to a second battery image 1110 while a battery isolation contactor 1016 is normally closed. A battery isolation contactor 1016 can open if a battery 1012 1014 reaches a high-temperature condition. In some embodiments, this can be accomplished by providing a ground to an isolation line contactor 1016 to energize an isolation line contactor 1016 in and open position.

In some embodiments, a crew advisory panel 1102 can display a fault message. As a non-limiting example, a detected anomaly can activate a light on a crew advisory panel 1102 (e.g., "HTM over temp"). A temperature sensor mounted in a section can close when a predetermined temperature is reached, and a ground signal can be sent to a processor box, which can translate an analog signal to a digital output of 1's and 0's. A digital signal can be either sent to an iPad®/tablet display, or any other known and/or convenient mobile display device, with a software app to convert digital data to utilize a mobile display device as a crew advisory panel 1102 or a dedicated monitor. In other embodiments, a crew advisory panel 1102 can comprise annunciator lights on instrument panel to indicate a fault.

In use, a crew advisory panel 1102 can provide a visual display of system status and function. For example, in one situation, a first power unit 1008 can be operating with a first generator 1018. In this case, a first generator image 1104 can be depicted as blue to the point of a first contactor image 1106. A first contactor image 1106 can be depicted as gray until a first contactor 1026 is selected to the "on" position. When a first contactor 1026 is selected "on", a first contactor image 1108 can be depicted as blue, along with a first system buss image 1110. If an operator choses to charge the batteries, a first battery line contactor can be closed and a first battery contactor image can display blue; a first battery image 1114 can also display blue. If a battery isolation contactor 1016 is closed, a segment image 1116 to a second battery image 1118 can also display blue. All other segments in this scenario can be depicted as gray.

Figure 12:
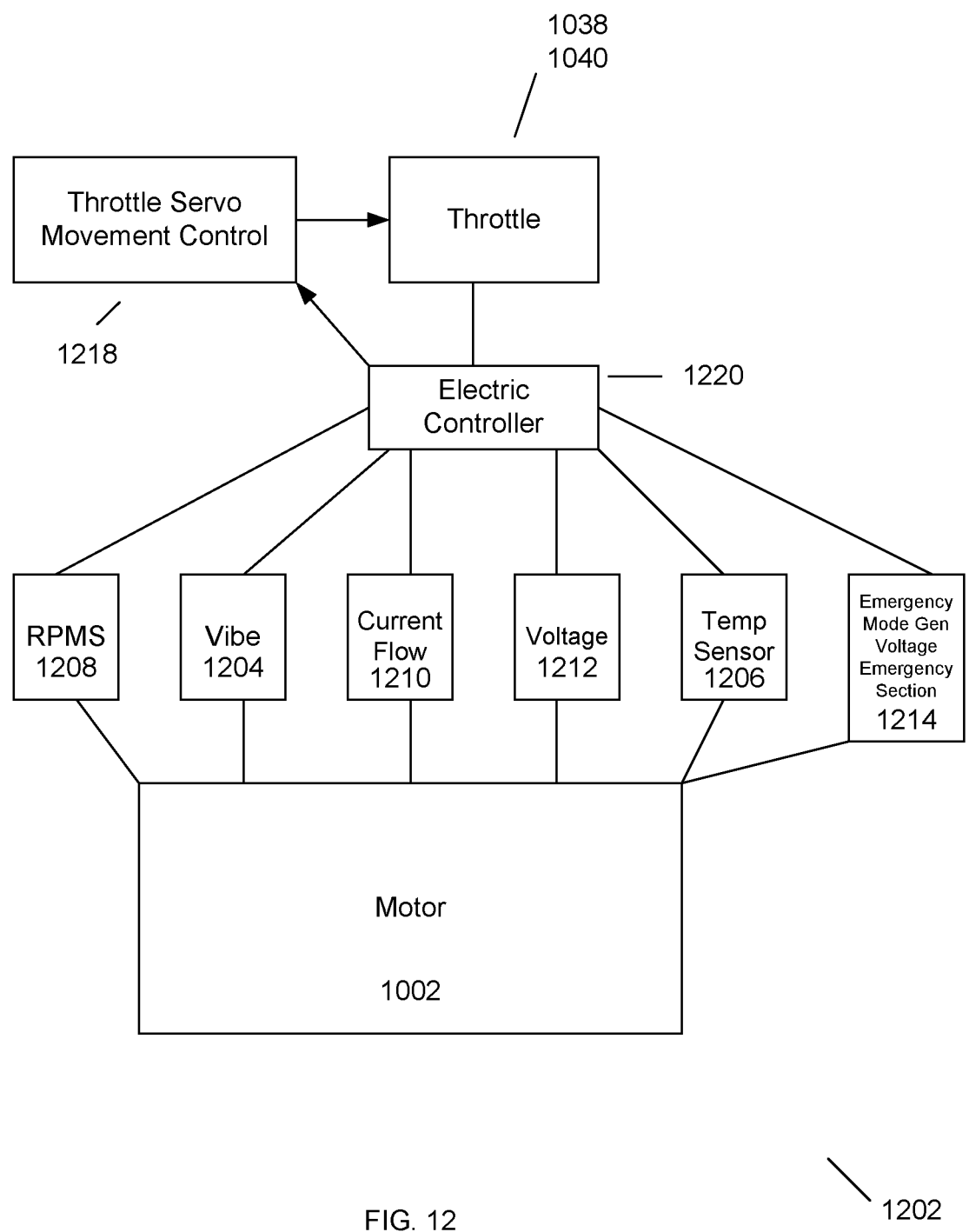
FIG. 12 is a diagram of an embodiment of a monitoring system panel.

FIG. 12 depicts a schematic of a system monitoring and control interface 1202, which can display the status of parameters monitored by an Electronic Controller 1220 in normal mode operation in all sections, such as, but not limited to:

Motor Vibration 1204, which can provide trend monitoring of a motor 1002 for a gradual increase in vibration over a period of time to inform inspection of rotating parts for wear;

Temperature 1206, which, via sensors located in the main sections of a motor 1002, can monitor for high temperatures in these area (in a visual representation, an indicator light can change from a predetermined color to flashing red, for example);

Motor RPMs 1208, which can provide feedback on performance, can be detected via a magnetic pick up mounted either within the motor assembly or external to a frame of structure and a toothed ring secured to shaft, or any other known and/or convenient device.

Current Flow 1210, which can be monitored in various system segments to locate and isolate a failure before the entire system is compromised.

Battery Voltage 1212, which can indicate voltage levels in power unit circuits 1004 1006, can be represented in a panel display 1202 via a predetermined color for levels greater than zero and gray to indicate no voltage;

Emergency Mode Parameters 1214, which can include, but are not limited to, generator voltages and temperatures in motor sections.

In some embodiments, an Electronic Controller 1220 can receive information from motor 1002 sensors (i.e., vibration, temperature, RPMs, current flow, voltage, and emergency parameters). An Electronic Controller 1220 can transmits information received from motor 1002 sensors to be displayed on a crews alerting system, advisory lights, a mobile phone, tablet, or computer application, or any other known and/or convenient device. An Electronic Controller 1220 can be configured to remotely control the speed of a motor 1002 or turn it off or on from an application-based program on a mobile phone, tablet, computer, or any other known and/or convenient device. In such embodiments, an Electronic Controller 1220 can be connected to an Internet connection via a wired or wi-fi connection. An Electronic Controller 1220 can also utilize a sim chip or other device from a phone provider to transmit data if an Internet connection is not available. An application user can completely control of a motor 1002, see all monitored parameters, turn a motor 1002 off/on, and control RPMs. An application-based platform can control a throttle 1038 1040 position because in such configurations a throttle assembly 1038 1040 can be configured with an internal servo motor 1218 that can drive throttles 1038 1040 in desired position when voltage and desired polarity is applied. An Electronic Controller 1220 can have an output to provide a desired voltage and polarity to a throttle assembly 1038 1040. To remotely control a motor 1002 RPMs, an Electronic Controller 1220 can be mounted on an electric motor or it can be remotely located connected to a motor 1002 with a quick-disconnect, or any other known and/or convenient type of connector.

In some embodiments, fail-safe operation can be conducted by monitoring for rotor or stator magnetic failure in an electronic speed controller system via monitoring current/voltage applied to electromagnets in a motor 1002. If rotor or stator electromagnet failure is detected the system can remove electrical power to an affected electromagnet and the electromagnet perpendicular to the failed electromagnet (within in same type of electromagnet, i.e., rotor or stator) to prevent complete motor failure, maintain motor balance and continue to operate at reduced output power. An electronic speed controller system can be utilized to regulate motor speed and power output by varying the voltage and polarity to the electromagnets, constantly changing the polarity to the electromagnets to induce rotation of the rotor. In some embodiments, the present system can also provide an indication of maintenance required to alert operators of potential electromagnet failure.

Figure 13:
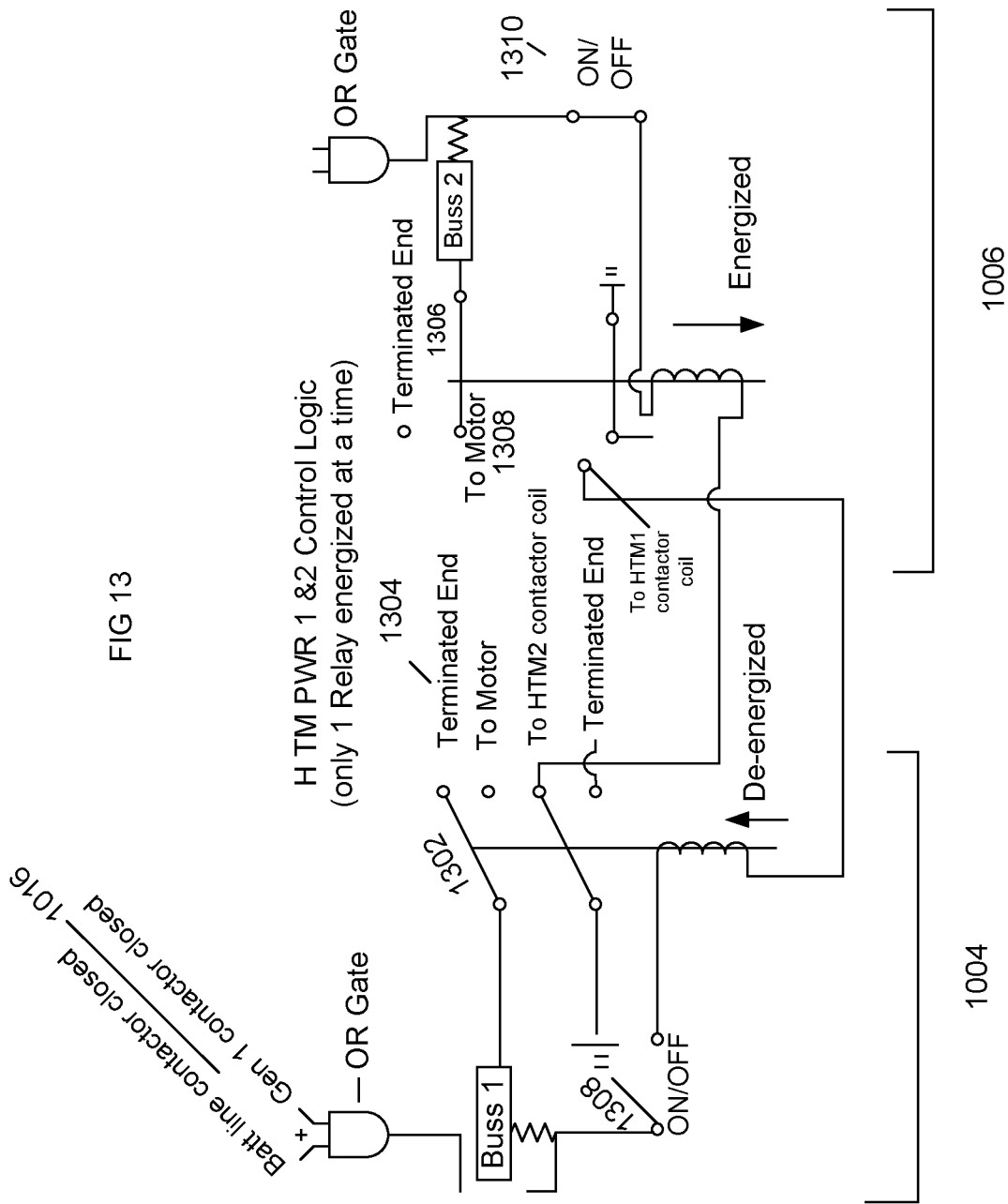
FIG. 13 is an electrical schematic of an embodiment of a failsafe operating system.

FIG. 13 depicts a fail-safe option of the electrical circuit for controlling the fail-safe feature of isolating a first electrical systems 1004 1006. Two sources for electrical power can be substantially completely isolated from one another via electrical contactors or relays. As shown in FIG. 13, as a non-limiting example in the event a first electrical system 1004 failed, a battery isolation contactor 1016 can be opened, isolating a first system 1004 and a second system 1006. In such a situation, a motor 1002 can continue to operate on a second electrical system 1006. As shown in FIG. 13, only one electrical source can power a motor 1002 at a time. A first motor switch 1302 can be in an alternate position to a first terminated end 1304. A second motor switch 1306 can be connected to motor terminal 1308. Further, a first buss switch 1308 can be in an open position, while a second buss switch 1310 can be in a closed position. When failure is detected this can be reversed, such that a motor 1002 can revert another system (in this example, a first system 1004) for electrical power. In some embodiments, the present system can also be configured the have more allow the operator to utilize both electrical systems 1004 1006 if desired. The system can be configured in any known and/or convenient way, depending on application.

Figure 14:
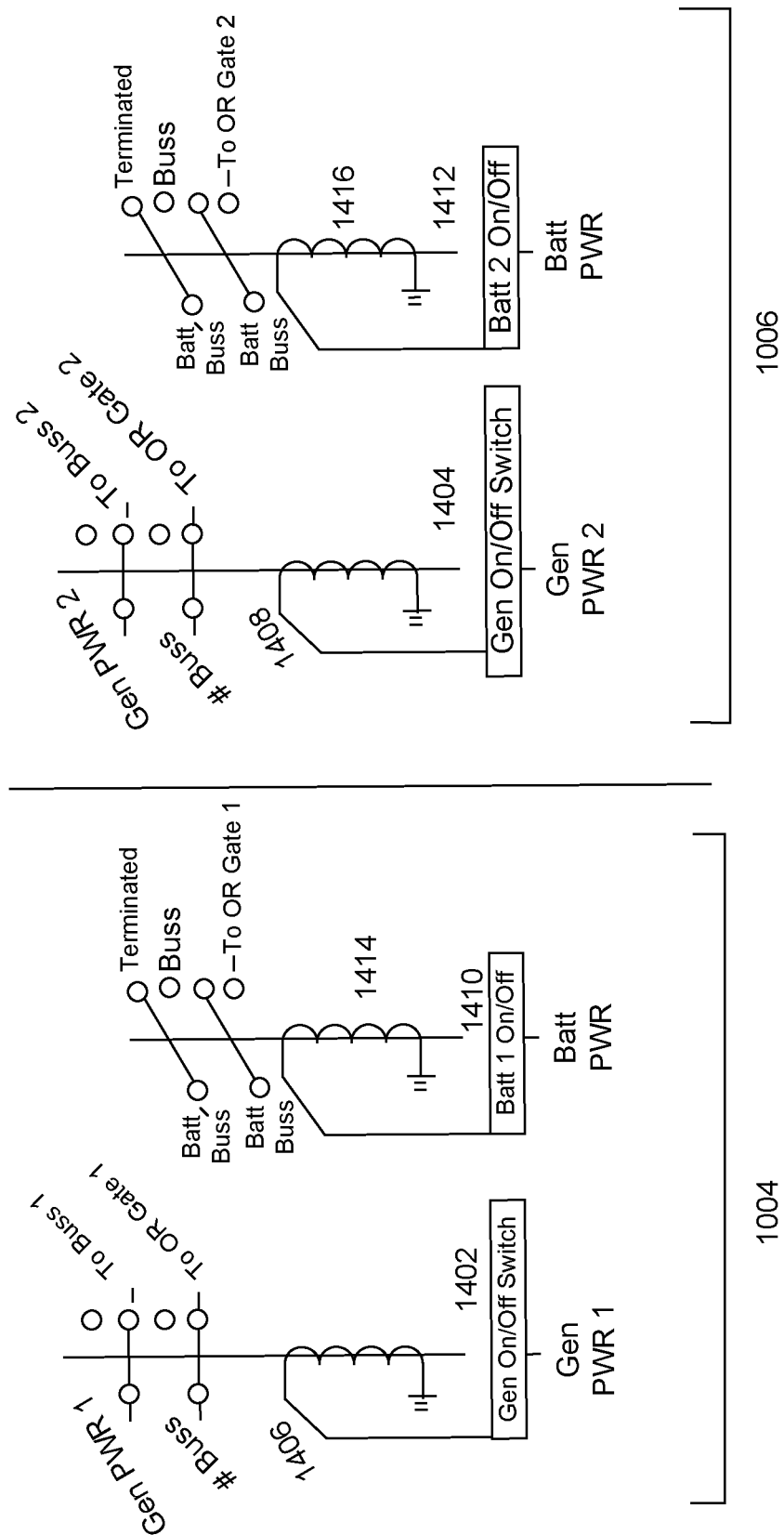
FIG. 14 is an electrical control schematic for the embodiment shown in FIG. 13. this diagram illustrates the generator on/off switches the generator line contactors, battery on/off switches battery line contactors.

FIG. 14 depicts electrical control for the system embodiment in FIG. 13. In some embodiments, the electrical control system can comprise a first generator on/off switch 1402 and a second generator on/off switch 1404, a first generator line contactor 1406 and a second generator line contactor 1408, a first battery on/off switch 1410 and a second battery on/off switch 1412, and a first battery line contactor 1414 and a second battery line contactor 1416

Figure 15:
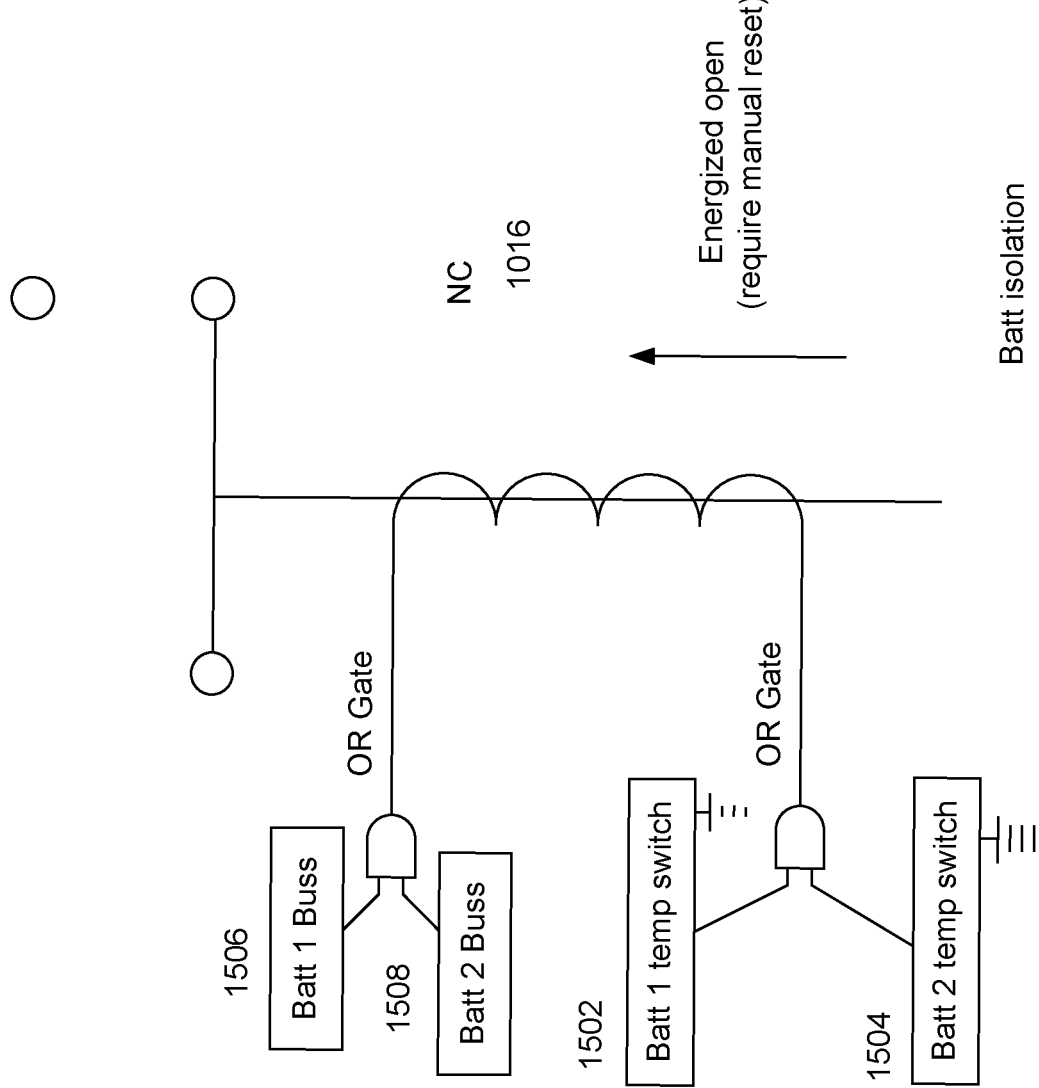
FIG. 15 is an electrical schematic of an embodiment of a fail-safe feature option of automatic battery isolation. when an over heated battery condition exists, the battery isolation contactor is energized to the open position by a electrical ground provided by a battery temp switch. Voltage is supplied to the battery contactor from battery 1 and battery 2 buss.

FIG. 15 depicts an electrical schematic of an embodiment of the present system's fail-safe feature option of automatic battery isolation when an over heated battery condition exists. In such situations, a 1016 battery isolation contactor can be energized to an open position by a electrical ground provided by a first battery temperature switch 1502 and a second battery temperature switch 1504. Voltage can be supplied to battery isolation contactor 1016 from a first battery buss 1506 and a second battery buss 1508.

Although one or more embodiments of the newly improved invention have been described in detail, one of ordinary skill in the art will appreciate the modifications to the material selection, design of the High Torque Electric Motor and configuration of electromechanical components to create a more energy efficient motor. It is acknowledged that obvious modifications will ensue to a person skilled in the art. The claims which follow will set out the full scope of the invention.

What is claimed is:

1. A high-torque electric motor comprising:
   a cylindrical shaft;
   two bearings at a top and a bottom end of said cylindrical shaft;
   a flywheel attached substantially perpendicularly and concentric to said cylindrical shaft;
   at least one magnet unit coupled to said cylindrical shaft;
   said magnet unit comprising electrical coils with electrical leads wrapped around a core of an electromagnet and connected with said cylindrical shaft;
   a power source for electrical potential in an electrical circuit connected by said electrical leads to said electrical coils;
   at least one housing electromagnet having a circular disc shape comprising four substantially identical radial sections and an inner region and an outer region, with a plurality of mounting locations on said at least one housing electromagnet; and
   each housing electromagnet radial section having a quarter-circular cutout of said inner region, wherein the four radial sections together form a circular disc shape with a circular cutout in substantially in the middle of said at least one housing electromagnet; wherein said electromagnet, and said electrical coils are mounted in said circular cutout of said housing electromagnet and mounted to said housing electromagnet, said electric leads connected to said electromagnet, and said electric circuit from said power source operable by coil current which induces a magnetic field across shaft magnets and housing magnets with opposite or same polarities on said shaft magnets to accelerate rotational movement of said cylindrical shaft about an axis and to produce torque.

2. The high torque motor of claim 1, further comprising:
   a plurality of threaded rods for insertion through holes of a first permanent magnet;
   a second electromagnet connected to said cylindrical shaft; and
   a second permanent magnet with through holes;
   wherein said second electromagnet and said second permanent magnet are assembled to said first permanent magnet with said plurality of threaded rods, and bolted in.

3. The high torque electric motor of claim 2, wherein said electromagnet has an air gap to said permanent magnet when said electromagnet and said cylindrical shaft are assembled in said permanent magnet.

4. The high torque electric motor of claim 1, wherein said power source can provide direct current.

5. The high torque electric motor of claim 1, wherein said power source can provide alternating current.

6. The high torque electric motor of claim 1, wherein said power source has a fail-safe switch acting as a circuit breaker, to deactivate said individual electromagnets sets or motor sections on command.

7. The high torque electric motor of claim 1, wherein said electromagnet is in the shape of an ellipse.

8. A multi-stage high-torque electric motor comprising:
stage 1 having a cylindrical shaft;
two bearings at a top and a bottom end of said cylindrical shaft;
at least one electromagnet/permanent magnet/iron connected to a middle portion of said cylindrical shaft;
a flywheel attached substantially perpendicular and concentric to said cylindrical shaft;
electrical coils with electrical leads wrapped around a core of said at least one electromagnet/permanent magnet/iron;
a power supply source for electrical potential in an electrical circuit connected by said electrical leads to said electrical coils;
at least one housing electromagnet having a circular disc shape with a plurality of/mounting locations on said housing electromagnet;
electrical coils with electrical leads wrapped around the core of said housing electromagnet; and
at least one housing electromagnet having a circular disc shape comprising four substantially identical radial sections and an inner region and an outer region, with a plurality of mounting locations on said at least one housing electromagnet; and
each housing electromagnet radial section having a quarter-circular cutout of said inner region, wherein the four radial sections together form a circular disc shape with a circular cutout in substantially in the middle of said at least one housing electromagnet, wherein said at least one electromagnet/permanent magnet/iron, and electrical coils are mounted in said circular cutout of said housing electromagnet and mounted to said housing electromagnet, said electrical leads connected to said housing electromagnet, and said electric circuit from said power supply source operable by coil current which induces a magnetic field across said cylindrical shaft electromagnets/permanent magnets/iron and said housing electromagnet with opposite or same polarity on said at least one electromagnet/permanent magnet/iron to accelerate rotational movement of said cylindrical shaft about an axis and to produce torque;
wherein when said multi-stage high-torque electric motor is at an operating speed, said stage 1 will be de-energized and a closed-loop leveraging motor will continue to operate and produce electricity for a limited amount of time until said close-loop leveraging motor is selected to an off position; and
wherein a plurality of threaded rods for insertion through holes in a permanent magnet; and
wherein a second electromagnet connected to said cylindrical shaft, and a second permanent magnet with through holes are assembled to a permanent magnet with said threaded rod, and bolted in.

9. The high torque electric motor of claim 8, wherein said power supply source can provide direct current.

10. The high torque electric motor of claim 8, wherein said power supply source can provide alternating current.

11. The high torque electric motor of claim 8, wherein said power supply source has a fail-safe switch acting as a circuit breaker, to deactivate said individual electromagnets sets or motor sections on command.

12. The high torque electric motor of claim 8, wherein said electromagnet is in the shape of an ellipse.

13. The high torque electric motor of claim 8, wherein said electromagnet is a type of iron.

14. The high torque electric motor of claim 8, wherein a fail-safe switch is connected to said electromagnets for individual ON/OFF control of each electromagnet.

* * * * *